(12) United States Patent
Schmidt et al.

(10) Patent No.: US 10,442,402 B2
(45) Date of Patent: Oct. 15, 2019

(54) SENSOR AND CLEANING APPARATUS

(71) Applicant: Ford Global Technologies, LLC, Dearborn, MI (US)

(72) Inventors: David Schmidt, Dearborn, MI (US); Scott Black, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/443,014

(22) Filed: Feb. 27, 2017

(65) Prior Publication Data

US 2018/0244245 A1 Aug. 30, 2018

(51) Int. Cl.
| | | |
|---|---|---|
| *G06F 7/00* | (2006.01) |
| *B60S 1/08* | (2006.01) |
| *B60S 1/52* | (2006.01) |
| *B60S 1/56* | (2006.01) |
| *B60R 1/04* | (2006.01) |
| *A47L 1/00* | (2006.01) |
| *B60S 1/02* | (2006.01) |
| *H04N 9/07* | (2006.01) |

(52) U.S. Cl.
CPC .............. *B60S 1/0888* (2013.01); *B60R 1/04* (2013.01); *B60S 1/52* (2013.01); *B60S 1/56* (2013.01)

(58) Field of Classification Search
CPC ........ B60S 1/0888; B60S 1/52; B60S 1/0818; A47L 1/02
USPC ..................... 701/36; 15/250.03, 36; 348/335
See application file for complete search history.

(56) References Cited

U.S. PATENT DOCUMENTS

| | | | |
|---|---|---|---|
| 6,607,606 B2 | 8/2003 | Bronson | |
| 7,839,491 B2 | 11/2010 | Harris et al. | |
| 9,086,486 B2 | 7/2015 | Gilliland et al. | |
| 2003/0233723 A1 | 12/2003 | Lizotte et al. | |
| 2008/0072393 A1* | 3/2008 | Tanaka ...................... A47L 1/02 15/250.03 |
| 2013/0104933 A1 | 5/2013 | Aldred et al. | |
| 2014/0036132 A1* | 2/2014 | Pawlowski .......... H04N 5/2171 348/335 |
| 2014/0095196 A1* | 4/2014 | Waterson ............... G06Q 10/10 705/2 |
| 2016/0052451 A1* | 2/2016 | O'Kane ................. B60Q 9/008 340/435 |
| 2016/0121855 A1 | 5/2016 | Doorley et al. | |
| 2016/0244028 A1 | 8/2016 | Wakatsuki | |

(Continued)

FOREIGN PATENT DOCUMENTS

| | | |
|---|---|---|
| DE | 102013006686 A1 | 10/2014 |
| DE | 102016006039 A1 | 11/2016 |
| JP | 2015182656 A | 10/2015 |

OTHER PUBLICATIONS

Search Report from United Kingdom Intellectual Property Office dated Aug. 23, 2018 regarding Application No. GB1803051.0 (4 pages).

*Primary Examiner* — Mahmoud S Ismail
(74) *Attorney, Agent, or Firm* — Frank A. MacKenzie; Bejin Bieneman PLC

(57) ABSTRACT

An apparatus includes a sensor supported by a sensor arm and a wiper blade. The sensor includes a cylindrical windows having an obstructed portion and a viewing portion. The wiper blade is attached to the sensor and movable across the viewing portion from a resting position contacting the obstructed portion.

20 Claims, 4 Drawing Sheets

(56) References Cited

U.S. PATENT DOCUMENTS

2017/0166168 A1* 6/2017 Hache ................... B60R 25/24
2018/0009418 A1* 1/2018 Newman ............... B60S 1/0818

* cited by examiner

SENSOR AND CLEANING APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
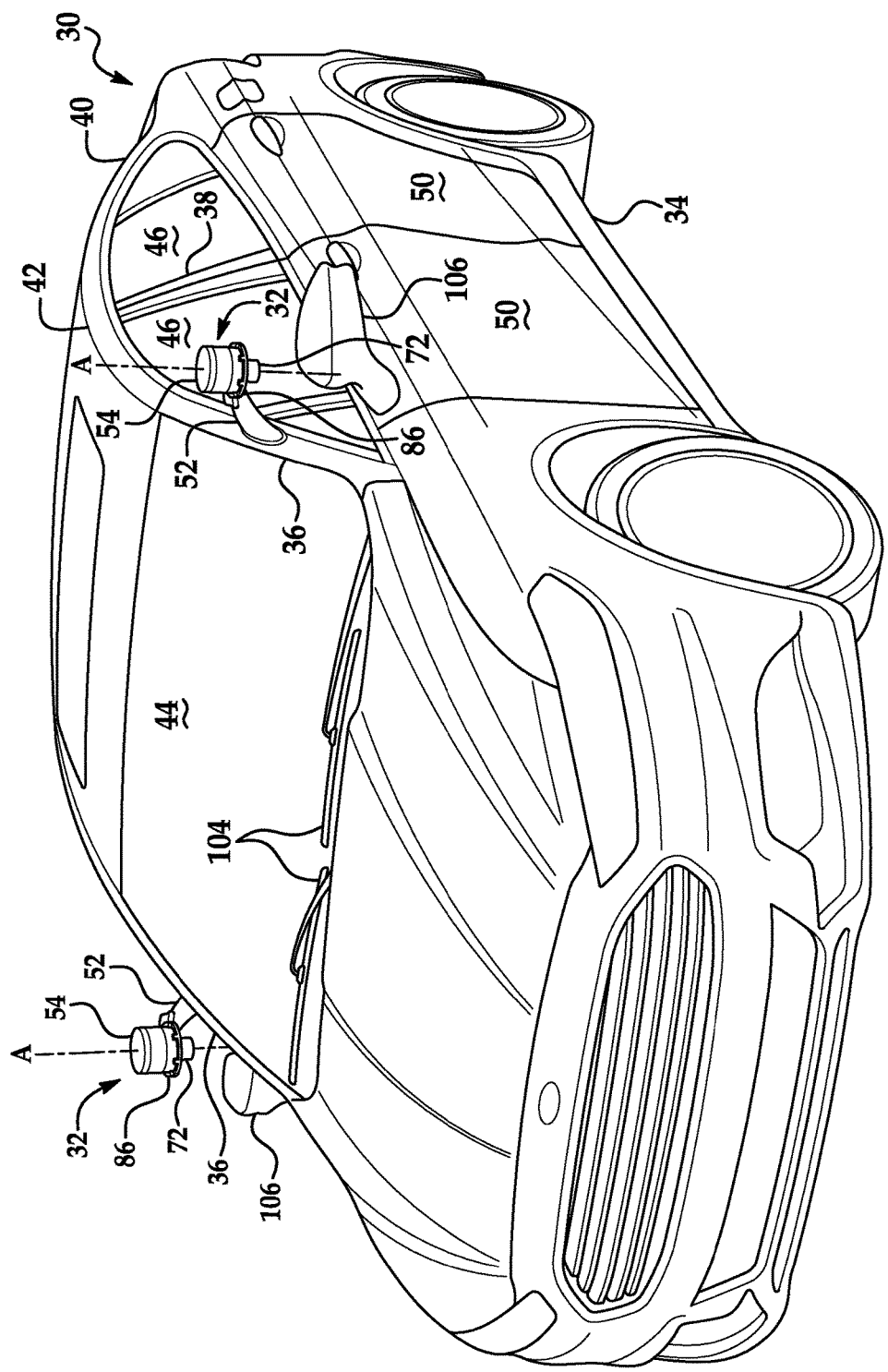
FIG. 1 is a perspective view of an example vehicle.

With reference to the Figures, wherein like numerals indicate like parts throughout the several views, an apparatus 32 includes a sensor 54 supported by a sensor arm 52 and a wiper blade 74. The sensor 54 includes a cylindrical window 62 having an obstructed portion 68 and a viewing portion 70. The wiper blade 74 is attached to the sensor 54 and movable across the viewing portion 70 from a resting position contacting the obstructed portion 68.

The apparatus 32 may include the sensor arm 52 extensible from a pillar 36, 38, 40 of a vehicle 30. Additionally, the obstructed portion 68 of the cylindrical window 62 faces the vehicle 30, and the viewing portion 70 of the cylindrical window 62 faces away from the vehicle 30. Additionally or alternatively, the apparatus 32 may include the pillar 36, 38, 40 of the vehicle 30. Additionally, the apparatus 32 may include a windshield 44 adjacent the pillar 36. Additionally, the pillar 36 may extend from a bottom of the windshield 44 to a top of the windshield 44. Additionally, the sensor arm 52 may be spaced from the bottom of the windshield 44 and spaced from the top of the windshield 44.

The cylindrical window 62 may define an axis A, and the wiper blade 74 may be rotatably coupled to the sensor 54 about the axis A. Additionally, the apparatus 32 may include a wiper arm 76 coupled to the sensor 54 and extending from a first end 78 that is at the axis A to a second end 80 that is at the wiper blade 74. Additionally, the wiper arm 76 and wiper blade 74 may be rotatable about the axis A between a first resting position, in which the wiper blade 74 contacts the obstructed portion 68, and a second resting position, in which the wiper blade 74 contacts the obstructed portion 68, such that the wiper blade 74 wipes the viewing portion 70 when rotating between the first and second resting positions. Additionally, the wiper arm 76 may be coupled to a bottom surface 58 of the sensor 54. Additionally, the sensor arm 52 may be attached to the bottom surface 58 of the sensor 54, and the sensor arm 52 may extend between the first and second ends 78, 80 of the wiper arm 76 in one of the resting positions. Alternatively or additionally, the apparatus 32 may include a motor 72 coupled to the sensor 54 and to the first end 78 of the wiper arm 76.

The apparatus 32 may include a sprayer 86 coupled to the sensor 54. Additionally, the sprayer 86 may be ring-shaped. Additionally, the cylindrical window 62 may have a diameter, and the sprayer 86 may have a diameter larger than the diameter of the cylindrical window 62. Additionally, the sprayer 86 may have a plurality of nozzles 88 directed towards the cylindrical window 62.

The apparatus 32 may include a motor 72 coupled to the sensor 54 and to the wiper blade 74 and a controller 98 in communication with the sensor 54 and the motor 72. Additionally, the controller 98 may be programmed to activate the motor 72 in response to a signal indicating that windshield wipers 104 are active. Alternatively or additionally, the controller 98 may be programmed to activate the motor 72 in response to a signal indicating that the viewing portion 70 of the cylindrical window 62 is obstructed.

The apparatus 32 cleans the sensor 54 and may thus allow the sensor 54 to more accurately detect the external environment. The apparatus 32 allows the wiper blade 74, used for cleaning, to avoid obstructing the vision of the sensor 54 when the wiper blade 74 is not in use. Moreover, the apparatus 32 is positioned relative to the rest of the vehicle 30 so that the apparatus 32 will not block the vision of the sensor 54 nor of a human driver of the vehicle 30 who is looking through the windshield 44 or a window of the vehicle 30.

Figure 2:
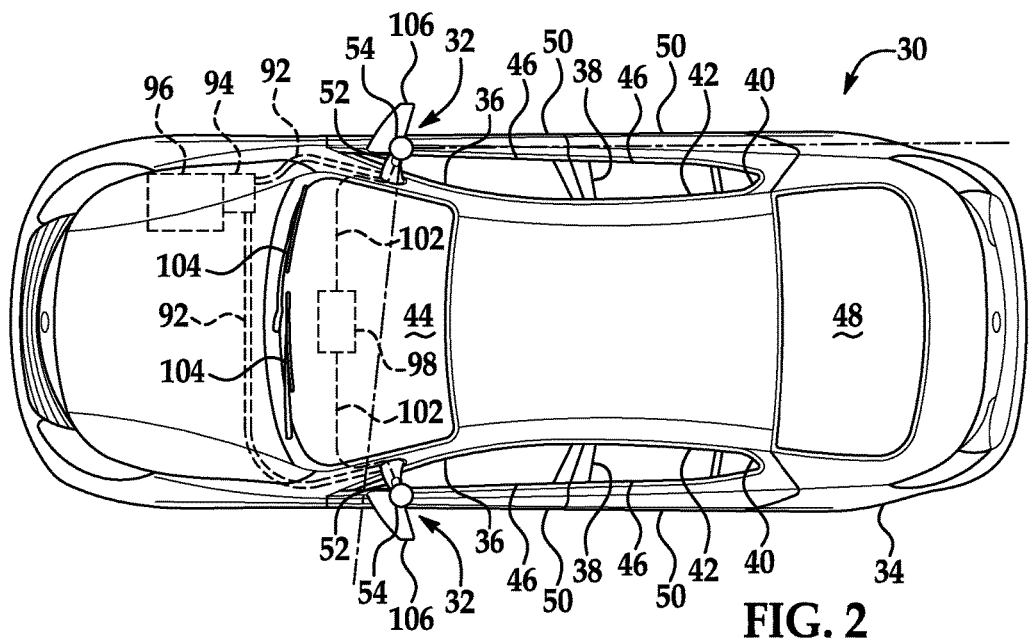
FIG. 2 is a top view of the vehicle.

With reference to FIGS. 1 and 2, a body 34 of the vehicle 30 may include A pillars 36, B pillars 38, C pillars 40, and roof rails 42. The A pillars 36 may extend between a windshield 44 and windows 46 and from a bottom of the windshield 44 to a top of the windshield 44. The B pillars 38 may extend between the windows 46 of adjacent doors 50. The C pillars 40 may extend between the windows 46 and a backlite 48. The body 34 may also include D pillars (not shown) if the vehicle 30 is, e.g., an SUV, crossover, minivan, or station wagon, in which case the C pillars 40 extend between the windows 46 of rear doors 50 and rear left and right windows 46, and the D pillars extend between the rear right and left windows 46 and the backlite 48. The roof rails 42 extend along the windows 46 from the A pillar 36 to the B pillar 38 to the C pillar 40.

The windshield 44 and windows 46 may be formed of any suitably durable transparent material, including glass such as laminated, tempered glass or plastic such as Plexiglas or polycarbonate. The windshield 44 is located adjacent the A pillar 36.

The vehicle 30 may include windshield wipers 104. The windshield wipers 104 may be positioned to contact the windshield 44. The windshield wipers 104 have blades that are pivoted across the windshield 44 to remove water or debris. The windshield wipers 104 may be powered by an electric motor (not shown).

The vehicle 30 may include side-view mirrors 106. The side-view mirrors 106 may be located on the front doors 50 or on the body 34 near the bottom of the windshield 44. The side-view mirrors 106 may be visible to a human driver through the windows 46 and provide a reflected view in a vehicle-rearward direction to the driver.

With continued reference to FIGS. 1 and 2, the sensor arm 52 extends from one of the pillars 36, 38, 40 of the vehicle 30, e.g., the A pillar 36, to the sensor 54. The sensor arm 52 may be located in the middle of the A pillar 36, that is, spaced from the bottom of the windshield 44 and from the top of the windshield 44. The sensor arm 52 is attached to the bottom surface 58 of the sensor 54. The sensor arm 52 may have a tubular shape, that is, a cavity may extend through the sensor arm 52. The cavity may allow wiring 102, tubes, etc. to pass through the sensor arm 52 while being shielded from the outside environment.

With reference to FIGS. 1 and 3-5, the sensor 54 is supported by the sensor arm 52. The sensor 54 may have a cylindrical shape with a top surface 56, the bottom surface 58, and a side surface 60. The top surface 56 faces up, that is, in a vehicle-upward direction, and the bottom surface 58 faces down, that is, in a vehicle-downward direction. The side-view mirror 106 may be located below the sensors 54, that is, in a vehicle-downward direction from the sensors 54, and the bottom surface may face the side-view mirror 106. The cylindrical shape of the sensor 54 defines the axis A, which runs through a center of the sensor 54. The axis A is oriented vertically relative to the vehicle 30.

The sensor 54 may be designed to detect features of the outside world; for example, the sensor 54 may be a radar sensor, a scanning laser range finder, a light detection and ranging (LIDAR) device, or an image processing sensor such as a camera. In particular, the sensor 54 may be a LIDAR device. A LIDAR device detects distances to objects by emitting laser pulses and measuring the time of flight for the pulse to travel to the object and back.

Figure 3:
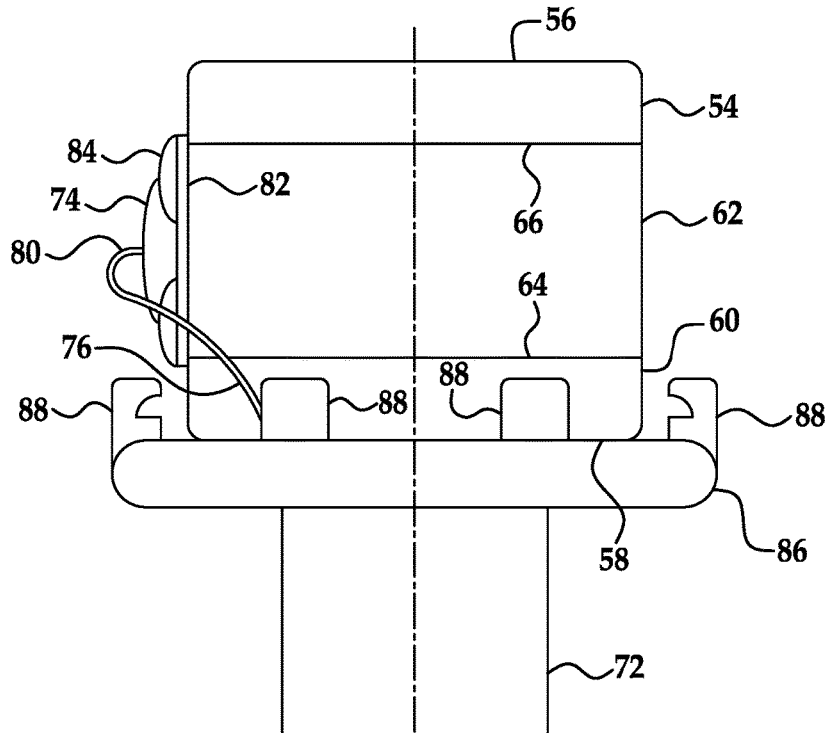
FIG. 3 is a side view of a portion of the vehicle including a sensor and a cleaning apparatus.

With reference to FIG. 3, the side surface 60 may include a cylindrical window 62. The cylindrical window 62 may also define the axis A. The cylindrical window 62 extends about the axis A. The cylindrical window 62 may extend fully about the axis A, that is, 360 degrees, or partially about the axis A. The cylindrical window 62 extends along the axis A from a bottom edge 64 to a top edge 66. The bottom edge 64 may be at the bottom surface 58 or may be spaced from the bottom surface 58 along the side surface 60. The top edge 66 may be at the top surface 56 or may be spaced from the top surface 56 along the side surface 60. The cylindrical window 62 has a diameter. The diameter of the cylindrical window 62 may be the same as the rest of the side surface 60, if any; in other words, the cylindrical window 62 may be flush with the side surface 60. At least some of the cylindrical window 62 is transparent with respect to whatever medium the sensor 54 is capable of detecting. For example, if the sensor 54 is a LIDAR device, then the cylindrical window 62 is transparent with respect to visible light.

Figure 4:
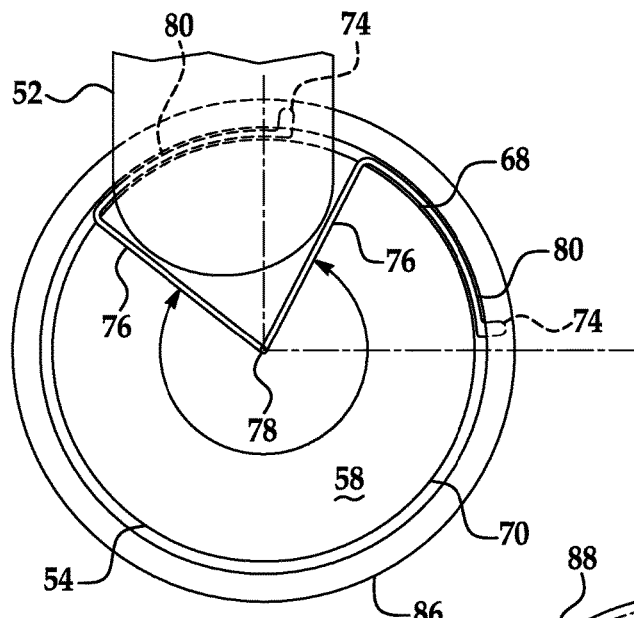
FIG. 4 is a bottom view of the sensor and a wiper arm of the cleaning apparatus.
Figure 5:
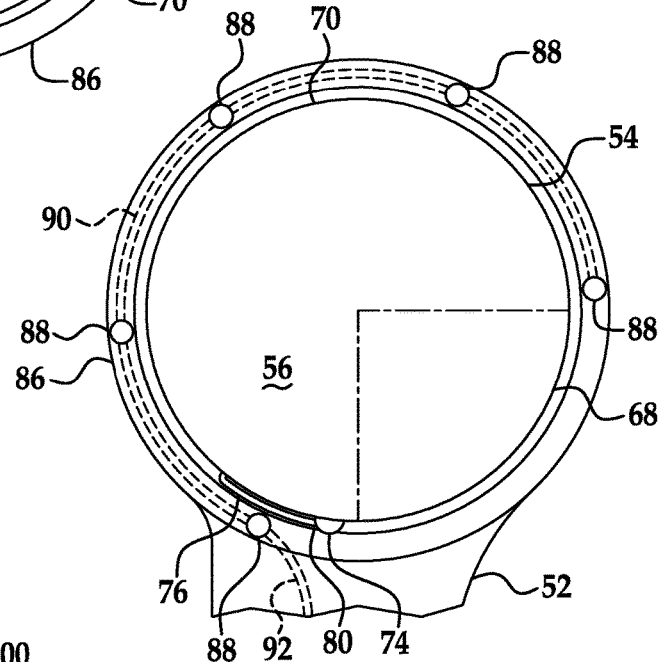
FIG. 5 is a top view of the sensor and the cleaning apparatus.

With reference to FIGS. 4 and 5, the cylindrical window 62 has the obstructed portion 68 and the viewing portion 70. The obstructed portion 68 faces the vehicle 30, and the viewing portion 70 faces away from the vehicle 30. In other words, the obstructed portion 68 is the area of the cylindrical window 62 for which the sensor 54 is blocked by the vehicle 30 from detecting the external environment. The viewing portion 70 is the area of the cylindrical window 62 through which the sensor 54 is able to detect the external environment without obstruction by the vehicle 30. If the sensor arm 52 extends from the middle of the A pillar 36, as shown in FIG. 1, then the viewing portion 70 may be approximately equal to or greater than 270 degrees.

With reference to FIG. 3, the motor 72 is coupled to the sensor 54 and to the wiper blade 74. The motor 72 may be fixed to the bottom surface 58 of the sensor 54, for example, by fastening. The motor 72 may be disposed between the sensor 54 and the side-view mirror 106. The motor 72 may be coupled to the wiper blade 74 indirectly; for example, the motor 72 may be coupled to the first end 78 of the wiper arm 76, which is coupled to the wiper blade 74. The motor 72 may be, for example, an electric motor having a rotational output.

With reference to FIGS. 3-5, the wiper arm 76 extends from the first end 78 to the second end 80. (The adjectives "first" and "second" are used throughout this document as identifiers and are not intended to signify importance or order.) The wiper arm 76, e.g., the first end 78 of the wiper arm 76, is coupled to the sensor 54, e.g., the bottom surface 58 of the sensor 54. The wiper arm 76 may be coupled directly or indirectly, e.g., via the motor 72. The first end 78 of the wiper arm 76 may be coupled at the axis A, thus allowing the wiper arm 76 to rotate about the axis A. The wiper arm 76 may be disposed between the sensor 54 and the side-view mirror 106. The wiper arm 76 may extend along the bottom surface 58 and the side surface 60 of the sensor 54. The wiper arm 76 may be curved around the sensor 54. In one of the resting positions, the sensor arm 52 may extend between the first and second ends 78, 80 of the wiper arm 76; that is, the wiper arm 76 may curve around the sensor arm 52 in one of the resting positions. The wiper arm 76 may be rigid so as to maintain the pressure of the wiper blade 74 against the cylindrical window 62.

The wiper blade 74 is attached to the sensor 54. The wiper blade 74 may be attached indirectly, e.g., via the wiper arm 76. The wiper blade 74 is rotatably coupled to the sensor 54 about the axis A, e.g., via the wiper arm 76.

With reference to FIG. 3, the wiper blade 74 may include a wiping edge 82. The wiping edge 82 may extend from at or below the bottom edge 64 of the cylindrical window 62 to at or above the top edge 66 of the cylindrical window 62. The wiping edge 82 may extend parallel to the axis A or at an angle relative to the axis A. The wiping edge 82 may be in contact with the cylindrical window 62 from at or below the bottom edge 64 of the cylindrical window 62 to at or above the top edge 66 of the cylindrical window 62.

The wiper blade 74 may include a wiper-blade body 84 connecting the wiping edge 82 to the wiper arm 76. The wiper-blade body 84 may apply substantially equal pressure along the length of the wiping edge 82 so that the wiping edge 82 maintains contact with the cylindrical window 62 or side surface 60 along the entire length of the wiping edge 82. For example, the wiper-blade body 84 may have a whippletree structure.

With reference to FIG. 4, the wiper arm 76 and wiper blade 74 are rotatable about the axis A between a first resting position in which the wiper blade 74 contacts the obstructed portion 68 of the cylindrical window 62 and a second resting position in which the wiper blade 74 contacts the obstructed portion 68 of the cylindrical window 62, such that the wiper blade 74 wipes the viewing portion 70 when rotating between the first and second resting positions. FIG. 4 shows the wiper arm 76 and wiper blade 74 in both resting positions. The motor 72 imparts rotational motion to the wiper arm 76, which pulls the wiper blade 74. The wiper blade 74 thus wipes all or substantially all of the viewing portion 70 of the cylindrical window 62, keeping the viewing portion 70 clear for the sensor 54 to use.

With reference to FIGS. 3-5, the sprayer 86 may be coupled to the sensor 54. The sprayer 86 may be ring-shaped and may have a diameter larger than the diameter of the cylindrical window 62. The sprayer 86 may be spaced from the side surface 60 of the sensor 54, and the wiper arm 76 may extend between the sprayer 86 and the side surface 60 of the sensor 54.

With reference to FIGS. 3 and 5, the sprayer 86 may have the plurality of nozzles 88 directed toward the cylindrical window 62 and a channel 90 extending through the sprayer 86 and feeding into the nozzles 88. The nozzles 88 may be spaced circumferentially about the sensor 54. The nozzles 88 may be located on a circle centered on the axis A. The nozzles 88 may be spaced evenly about the axis A or partially about the axis A, or the nozzles 88 may be more closely spaced on a vehicle-forward side of the sensor 54 than on a vehicle-rearward side of the sensor 54.

With reference to FIG. 1, a supply line 92 may extend from a pump 94 and a reservoir 96 to the sprayer 86. The supply line 92 may be, e.g., a flexible tube. The supply line 92 may extend through the A pillar 36 and through the sensor arm 52 and connect to the channel 90. The reservoir 96 may be a tank fillable with liquid, e.g., washing fluid for window cleaning. The reservoir 96 may also supply washing fluid to sprayers (not shown) directed at the windshield 44. The pump 94 may force the washing fluid through the supply line 92 to the sprayer 86 with sufficient pressure that the washing fluid sprays from the nozzles 88 onto the cylindrical window 62.

Figure 6:
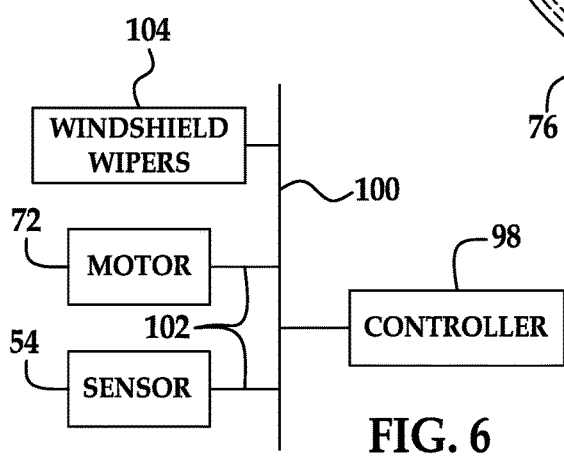
FIG. 6 is a block diagram of a control system for the cleaning apparatus.

With reference to FIGS. 2 and 6, the controller 98 may be a microprocessor-based controller. The controller 98 may include a processor, memory, etc. The memory of the controller 98 may include memory for storing instructions executable by the processor as well as for electronically storing data and/or databases.

With reference to FIG. 6, the controller 98 may transmit signals through a communications network 100 such as a controller area network (CAN) bus, Ethernet, Local Interconnect Network (LIN), and/or by any other wired or wireless communications network. The controller 98 may be in communication with the sensor 54, the motor 72, and the windshield wipers 104, among other components.

With reference to FIGS. 2 and 6, the communications network 100 may include the wiring 102 extending through the A pillar 36 and/or the sensor arm 52. The wiring 102 may connect the controller 98 with the sensor 54 and/or the motor 72. The wiring 102 may provide power to the motor 72 and/or the sensor 54.

Figure 7:
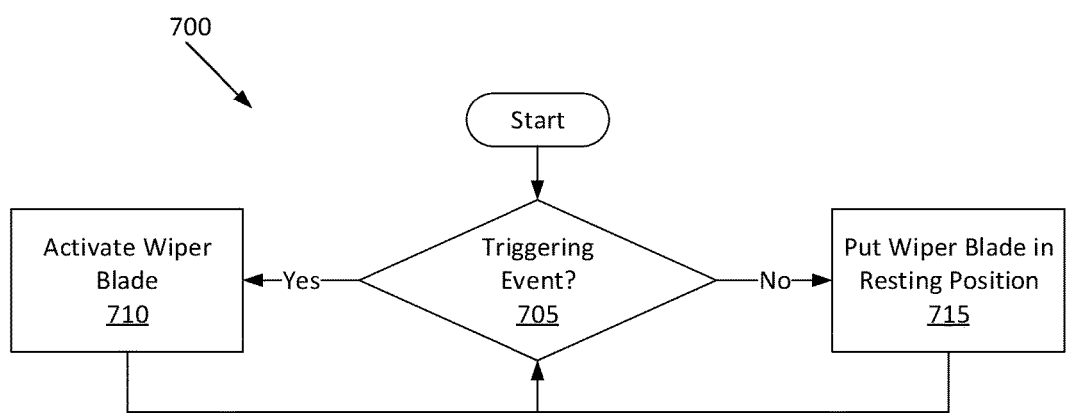
FIG. 7 is a process flow diagram for an exemplary process for controlling the cleaning apparatus.

FIG. 7 is a process flow diagram illustrating an exemplary process 700 for controlling the wiping of the sensor 54. The controller 98 may be programmed to follow the steps of the process 700.

The process 700 begins in a decision block 705. In the decision block 705, the controller 98 determines whether a triggering event is occurring. A triggering event is any occurrence that indicates that the wiper blade 74 should be wiping the cylindrical window 62 of the sensor 54. For example, the triggering event may be that the windshield wipers 104 are active. Specifically, the controller 98 may receive a signal from the windshield wipers 104 indicating that the windshield wipers 104 are active. For another example, the triggering event may be that the sensor 54 detects an obstruction and sends a signal to the controller 98. The obstruction may be dirt, dust, rain, an insect, etc. For another example, the triggering event may be a signal from a rain sensor (not shown) indicating rain. If a triggering event is not occurring, the process 700 proceeds to a block 715.

If a triggering event is occurring, next, in a block 710, the controller 98 activates the motor 72 in response to the triggering event, so the wiper blade 74 begins wiping. The wiper blade 74 thus clears the rain or other obstructions. The controller 98 may also include programming for controlling the motor 72 to affect the speed and duration of wiping by the wiper blade 74. After the block 710, the process 700 proceeds back to the decision block 705, meaning that if the triggering event is still occurring, the wiper blade 74 will continue wiping.

If a triggering event is not occurring, in the block 715, the controller 98 instructs the motor 72 to rotate the wiper blade 74 into one of the resting positions. If the wiper blade 74 is in one of the resting positions, the wiper blade 74 does not move. After the block 715, the process 700 proceeds back to the decision block 705, meaning that the controller 98 continuously monitors for triggering events.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
   a sensor supported by a sensor arm and including a cylindrical window, the cylindrical window being transparent to a medium the sensor is capable of detecting and having a permanently obstructed portion and a viewing portion; and
   a wiper blade attached to the sensor and movable across the viewing portion from a resting position contacting the permanently obstructed portion.

2. The apparatus of claim 1, further comprising the sensor arm extensible from a pillar of a vehicle.

3. The apparatus of claim 2, wherein the permanently obstructed portion of the cylindrical window faces the vehicle, and the viewing portion of the cylindrical window faces away from the vehicle.

4. The apparatus of claim 2, further comprising a windshield adjacent the pillar.

5. The apparatus of claim 4, wherein the pillar extends from a bottom of the windshield to a top of the windshield.

6. The apparatus of claim 5, wherein the sensor arm is spaced from the bottom of the windshield and from the top of the windshield.

7. The apparatus of claim 1, wherein the cylindrical window defines an axis, and the wiper blade is rotatably coupled to the sensor about the axis.

8. The apparatus of claim 7, further comprising a wiper arm coupled to the sensor and extending from a first end that is at the axis to a second end that is at the wiper blade.

9. The apparatus of claim 8, wherein the wiper arm and wiper blade are rotatable about the axis between a first resting position in which the wiper blade contacts the permanently obstructed portion and a second resting position in which the wiper blade contacts the permanently obstructed portion, such that the wiper blade wipes the viewing portion when rotating between the first and second resting positions.

10. The apparatus in claim 9, wherein the wiper arm is coupled to a bottom surface of the sensor.

11. The apparatus of claim 10, wherein the sensor arm is attached to the bottom surface of the sensor, and the sensor arm extends between the first and second ends of the wiper arm in one of the resting positions.

12. The apparatus of claim 10, further comprising a motor coupled to the sensor and to the first end of the wiper arm.

13. The apparatus of claim 1, further comprising a sprayer coupled to the sensor.

14. The apparatus of claim 13, wherein the sprayer is ring-shaped.

15. The apparatus of claim 14, wherein the cylindrical window has a diameter, and the sprayer has a diameter larger than the diameter of the cylindrical window.

16. The apparatus of claim 15, wherein the sprayer has a plurality of nozzles directed toward the cylindrical window.

17. The apparatus of claim 1, further comprising a motor coupled to the sensor and to the wiper blade, and a controller in communication with the sensor and the motor.

18. The apparatus of claim 17, wherein the controller is programmed to activate the motor in response to a signal indicating that windshield wipers are active.

19. The apparatus of claim 17, wherein the controller is programmed to activate the motor in response to a signal indicating that the viewing portion of the cylindrical window is obstructed.

20. An apparatus comprising:
a sensor supported by a sensor arm and including a cylindrical window, the cylindrical window being transparent to a medium the sensor is capable of detecting and having a permanently obstructed portion and a viewing portion; and
a wiper blade attached to the sensor and movable across the viewing portion from a resting position contacting the permanently obstructed portion;
wherein the permanently obstructed portion of the cylindrical window faces a vehicle to which the sensor arm is attached, and the viewing portion of the cylindrical window faces away from the vehicle.

* * * * *